United States Patent
Kim et al.

(10) Patent No.: US 12,080,877 B2
(45) Date of Patent: Sep. 3, 2024

(54) POSITIVE ELECTRODE MATERIAL FOR LITHIUM SECONDARY BATTERY, AND POSITIVE ELECTRODE FOR LITHIUM SECONDARY BATTERY AND LITHIUM SECONDARY BATTERY INCLUDING THE SAME

(71) Applicant: LG Chem, Ltd., Seoul (KR)

(72) Inventors: Dong Hwi Kim, Daejeon (KR); Dong Hun Lee, Daejeon (KR); Wang Mo Jung, Daejeon (KR); Sung Bin Park, Daejeon (KR); Gi Beom Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 549 days.

(21) Appl. No.: 17/047,884

(22) PCT Filed: May 22, 2019

(86) PCT No.: PCT/KR2019/006146
§ 371 (c)(1),
(2) Date: Oct. 15, 2020

(87) PCT Pub. No.: WO2019/225969
PCT Pub. Date: Nov. 28, 2019

(65) Prior Publication Data
US 2021/0167365 A1    Jun. 3, 2021

(30) Foreign Application Priority Data
May 23, 2018   (KR) .................. 10-2018-0058423

(51) Int. Cl.
*H01M 4/36*      (2006.01)
*H01M 4/505*    (2010.01)
(Continued)

(52) U.S. Cl.
CPC ........... *H01M 4/364* (2013.01); *H01M 4/505* (2013.01); *H01M 4/525* (2013.01);
(Continued)

(58) Field of Classification Search
CPC ................. H01M 4/364; H01M 4/505; H01M 2004/021; H01M 2004/028; H01M 4/525; H10M 10/525; H10M 10/0525
See application file for complete search history.

(56) References Cited

U.S. PATENT DOCUMENTS

2010/0081055 A1    4/2010   Konishi et al.
2012/0156560 A1*   6/2012   Hong .................... H01M 4/525
                                                                 429/211

(Continued)

FOREIGN PATENT DOCUMENTS

CN     102449822 A    5/2012
CN     107154491 A    9/2017
(Continued)

OTHER PUBLICATIONS

Extended European Search Report including Written Opinion for Application No. 19807490.8 dated Apr. 26, 2021, pp. 1-8.
(Continued)

*Primary Examiner* — Milton I Cano
*Assistant Examiner* — Albert Michael Hilton
(74) *Attorney, Agent, or Firm* — Lerner David LLP

(57) ABSTRACT

A positive electrode material for a lithium secondary battery includes a first positive electrode active material and a second positive electrode active material, both of which are lithium composite transition metal oxides containing transition metals. The first positive electrode active material has a larger average particle size ($D_{50}$) than the second positive electrode active material, wherein a ratio $(Li/Me)_1$ of the mole number of lithium with respect to the total mole (Continued)

number of transition metals of the first positive electrode active material is more than 1 to 1.5 or less, and a ratio $(Li/Me)_2$ of the mole number of lithium (Li) with respect to the total mole number of transition metals of the second positive electrode active material is 0.9 to 1. The second positive electrode active material has a crystallite size of 180 nm or more.

8 Claims, 3 Drawing Sheets

(51) Int. Cl.
 H01M 4/525 (2010.01)
 H01M 10/0525 (2010.01)
 H01M 4/02 (2006.01)
(52) U.S. Cl.
 CPC .. *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2014/0141335 | A1 | 5/2014 | Tsuchikawa et al. |
| 2014/0158932 | A1 | 6/2014 | Sun et al. |
| 2014/0377659 | A1 | 12/2014 | Oljaca et al. |
| 2015/0090924 | A1 | 4/2015 | Lee et al. |
| 2015/0162598 | A1 | 6/2015 | Kim et al. |
| 2015/0188136 | A1 | 7/2015 | Mori et al. |
| 2015/0249248 | A1 | 9/2015 | Ishizaki et al. |
| 2017/0149049 | A1 | 5/2017 | Endoh et al. |
| 2019/0115596 | A1 | 4/2019 | Kajiyama et al. |

FOREIGN PATENT DOCUMENTS

| | | |
|---|---|---|
| EP | 2169745 A1 | 3/2010 |
| JP | 2003-229128 A | 8/2003 |
| JP | 2010086693 A | 4/2010 |
| JP | 2013065468 A | 4/2013 |
| JP | 2015026594 A | 2/2015 |
| JP | 5839034 B2 | 1/2016 |
| JP | 2016119288 A | 6/2016 |
| JP | 2016526759 A | 9/2016 |
| JP | 2017188428 A | 10/2017 |
| JP | 2017-212117 A | 11/2017 |
| KR | 20090127589 A | 12/2009 |
| KR | 20140018685 A | 2/2014 |
| KR | 20140098433 A | 8/2014 |
| KR | 20150030232 A | 3/2015 |
| KR | 101510940 B1 | 4/2015 |
| KR | 20150037085 A | 4/2015 |
| KR | 20150073969 A | 7/2015 |
| KR | 20160083631 A | 7/2016 |
| KR | 20160123164 A | 10/2016 |
| KR | 20170022990 A | 3/2017 |
| WO | 2017170548 A1 | 10/2017 |
| WO | 2019088805 A2 | 5/2019 |

OTHER PUBLICATIONS

International Search Report for Application No. PCT/KR2019/006146 mailed Sep. 5, 2019, 2 pages.

Che Mohamed Hussein, Siti Nurliyana et al., "Colloidal Stability of CA, SDS and PVA Coated Iron Oxide Nanoparticles (IONPs): Effect of Molar Ratio and Salinity." Polymers vol. 14,21 4787. Nov. 7, 2022, doi:10.3390/polym14214787. 16 pgs.

* cited by examiner

POSITIVE ELECTRODE MATERIAL FOR LITHIUM SECONDARY BATTERY, AND POSITIVE ELECTRODE FOR LITHIUM SECONDARY BATTERY AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2019/006146, filed May 22, 2019, which claims priority to Korean Patent Application No. 10-2018-0058423, filed on May 23, 2018, the disclosures of which are incorporated herein by reference in their entirety.

TECHNICAL FIELD

The present invention relates to a positive electrode material for a lithium secondary battery, and a positive electrode for a lithium secondary battery and a lithium secondary battery, which include the same.

BACKGROUND ART

Recently, with the rapid spread of electronic devices using batteries such as mobile phones, notebook computers, and electric vehicles, the demand for secondary batteries which have a small size and a light weight, and relatively high capacity has been rapidly increasing. Particularly, since a lithium secondary battery has a small size and a light weight, and a high energy density, it is attracting attention as a driving power source for portable devices. As a result, research and development efforts have been actively made to improve the performance of a lithium secondary battery.

A lithium secondary battery includes an organic electrolyte solution or a polymer electrolyte solution filled between the positive electrode and the negative electrode, which consist of an active material enabling the intercalation and deintercalation of a lithium ion, and produces electric energy through oxidation and reduction when a lithium ion is intercalated/deintercalated in/from the positive electrode and the negative electrode.

A positive electrode active material or positive electrode material of the lithium secondary battery generally uses a lithium cobalt oxide ($LiCoO_2$), and other than this, the use of $LiMnO_2$ with a layered crystal structure or $LiMn_2O_4$ with a spinel crystal structure, or a lithium nickel oxide ($LiNiO_2$) is also considered.

Recently, to realize high capacity and high output under a high voltage, technology using an excess lithium-containing lithium transition metal oxide in which a lithium content is higher than a transition metal content as a positive electrode active material has been disclosed. However, since an excess lithium-containing lithium transition metal oxide has a high irreversible capacity, and oxygen, other than lithium, is released to the outside of the active material structure in high voltage activation for utilizing surplus lithium, there is a problem in that the active material structure collapses and a voltage sagging phenomenon occurs, thereby promoting the degeneration of a battery cell.

Therefore, there is a high demand for a positive electrode active material which can exhibit improved output and capacity characteristics and improve structural stability.

PRIOR ART DOCUMENT

Patent Document

Korean Patent No. 10-1510940

DISCLOSURE

Technical Problem

The present invention is directed to providing a positive electrode material for a lithium secondary battery, which has enhanced output and cycle characteristics and improved thermal stability using specific large particles and small particles.

The present invention is also directed to providing a positive electrode for a lithium secondary battery and a lithium secondary battery, which include the above-described positive electrode material for a lithium secondary battery.

Technical Solution

The present invention provides a positive electrode material for a lithium secondary battery, which includes a first positive electrode active material and a second positive electrode active material, wherein the first positive electrode active material and the second positive electrode active material are lithium composite transition metal oxides containing transition metals such as nickel (Ni), cobalt (Co) and manganese (Mn), the first positive electrode active material has a larger average particle size ($D_{50}$) than the second positive electrode active material, a ratio $(Li/Me)_1$ of the mole number of lithium with respect to the total mole number of transition metals of the first positive electrode active material is more than 1 to 1.5 or less, a ratio $(Li/Me)_2$ of the mole number of lithium (Li) with respect to the total mole number of transition metals of the second positive electrode active material is 0.9 to 1, and the second positive electrode active material has a crystallite size of 180 nm or more.

The present invention also provides a positive electrode for a lithium secondary battery, which includes the positive electrode material for a lithium secondary battery.

The present invention also provides a lithium secondary battery, which includes the positive electrode for a lithium secondary battery.

Advantageous Effects

A positive electrode material for a lithium secondary battery of the present invention includes large particles in which a ratio $(Li/Me)_1$ of the mole number of lithium with respect to the total mole number of transition metals is more than 1 to 1.5 or less, and small particles in which a ratio $(Li/Me)_2$ of the mole number of lithium (Li) with respect to the total mole number of transition metals is 0.9 to 1, and a crystallite size is 180 nm or more. Therefore, high capacity and high output can be realized, and thermal stability such as an improved high-temperature life span characteristic and a decreased gassing amount during high temperature storage can be enhanced.

MODES OF THE INVENTION

Figure 1:
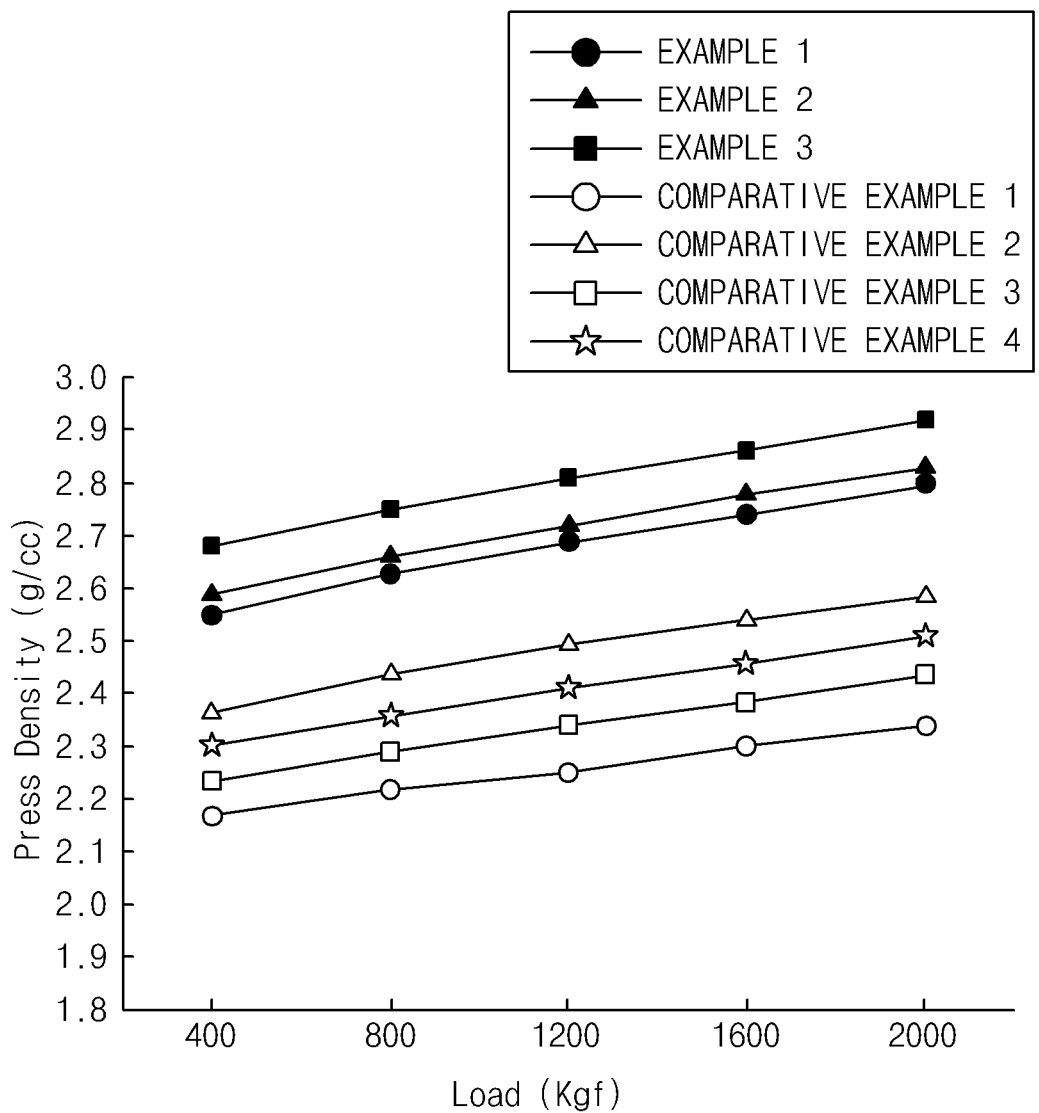
FIG. 1 is a graph of rolling densities of positive electrode materials for a lithium secondary battery according to Examples and Comparative Examples.

Terms and words used in the specification and claims should not be construed as limited to general or dictionary meanings, and should be interpreted with the meaning and concept in accordance with the technical idea of the present invention based on the principle that the inventors have appropriately defined the concepts of terms in order to explain the invention in the best way.

The terms used in the specification are used only to explain specific examples, not to limit the present invention. Singular expressions include plural referents unless clearly indicated otherwise in the context.

The terms "include" and "have" used herein designate the presence of characteristics, numbers, stages, components or a combination thereof, and it should be understood that the possibility of the presence or addition of one or more other characteristics, numbers, stages, components, or a combination thereof is not excluded in advance.

The "%" used herein means a weight percent (wt %) unless explicitly indicated otherwise.

Hereinafter, the present invention will be described in detail.

Positive Electrode Material for Lithium Secondary Battery

A positive electrode material for a lithium secondary battery according to the present invention includes a first positive electrode active material and a second positive electrode active material, wherein the first positive electrode active material and the second positive electrode active material are lithium composite transition metal oxides which contain a transition metal such as nickel (Ni), cobalt (Co) or manganese (Mn), the first positive electrode active material has a larger average particle size ($D_{50}$) than the second positive electrode active material, a ratio $(Li/Me)_1$ of the mole number of lithium with respect to the total mole number of transition metals of the first positive electrode active material is more than 1 to 1.5 or less, a ratio $(Li/Me)_2$ of the mole number of lithium (Li) with respect to the total mole number of transition metals of the second positive electrode active material is 0.9 to 1, and the second positive electrode active material has a crystallite size of 180 nm or more.

The positive electrode material for a lithium secondary battery of the present invention includes large particles in which a ratio $(Li/Me)_1$ of the mole number of lithium with respect to the total mole number of transition metals is more than 1 to 1.5 or less, and small particles in which a ratio $(Li/Me)_2$ of the mole number of lithium (Li) with respect to the total mole number of transition metals is 0.9 to 1 and a crystallite size is 180 nm or more. Therefore, high capacity and high output may be achieved using the large particle containing excess lithium. In addition, as the small particle having the above-described crystallite size is mixed with the large particle, the entire structural stability of the positive electrode active material may be enhanced, electrolyte side reactions of the large particle may be effectively prevented, and the above-described high capacity and high output may be achieved and the cycle characteristics may be enhanced by preventing the destruction of an active material structure. In addition, the positive electrode active material may be enhanced in thermal stability such as a high-temperature life span characteristic and a decreased gassing amount during high-temperature storage by the small particle having the above described crystallite size range.

The positive electrode material for a lithium secondary battery according to the present invention includes a first positive electrode active material and a second positive electrode active material, and specifically, includes a first positive electrode active material as a large particle and a second positive electrode active material as a small particle. The average particle size ($D_{50}$) of the first positive electrode active material is larger than that of the second positive electrode active material.

To enhance the capacity per volume of the positive electrode for a secondary battery, it is necessary to increase the density of a positive electrode active material layer, and as a method of increasing the density of the positive electrode active material layer, a method of reducing pores between the positive electrode active material particles and increasing a rolling density (or electrode density) is used. In the case of a bimodal positive electrode material in which large particles and small particles of positive electrode active materials are mixed as described in the present invention, an empty space between the large particles of the positive electrode active material may be filled with the small particles of the positive electrode active material, and therefore, more dense packing is possible, and the energy density of the positive electrode may be increased.

In the present invention, the average particle size ($D_{50}$) may be defined as a particle size corresponding to 50% of volumetric accumulation in a particle size distribution curve. The average particle size ($D_{50}$) may be measured using, for example, a laser diffraction method. For example, according to a method of measuring the average particle size ($D_{50}$) of the positive electrode active material, the average particle size ($D_{50}$) corresponding to 50% of volumetric accumulation in a measurement device may be calculated after particles of positive electrode active materials are dispersed in a dispersion medium, and the dispersed product is introduced into a commercially available laser diffraction particle size measurement device (e.g., Microtrac MT 3000) and ultrasonic waves of about 28 kHz are applied at an output of 60 W.

More specifically, a ratio of the average particle sizes ($D_{50}$) of the first positive electrode active material and the second positive electrode active material may be 1.5:1 to 4:1, and more preferably, the ratio of the average particle sizes ($D_{50}$) of the first positive electrode active material and the second positive electrode active material is 2:1 to 3.5:1.

When the above range of the ratio of the average particle sizes ($D_{50}$) of the first positive electrode active material and the second positive electrode active material is satisfied, pores between the particles of the positive electrode active materials may be more effectively reduced, a packing density may be increased, the density of the positive electrode may be enhanced, and the capacity per volume of the positive electrode may be effectively enhanced.

The first positive electrode active material is a lithium composite transition metal oxide containing nickel (Ni), cobalt (Co) and manganese (Mn).

The first positive electrode active material may be a lithium composite transition metal oxide containing excess lithium, and thus the capacity and output characteristics of a battery may be improved.

The first positive electrode active material may have the ratio $(Li/Me)_1$ of the mole number of lithium (Li) with respect to the total mole number of transition metals of more than 1 to 1.5 or less, and specifically, 1.01 to 1.3. When the ratio $(Li/Me)_1$ is 1 or less, there is a concern about a reduction in capacity, and when the ratio is more than 1.5, particles are sintered in a sintering process, and thus the preparation of the positive electrode active material may be difficult, and there are concerns about deintercalation of oxygen from the active material structure and intensification of the side reactions with an electrolyte in charging/discharging.

Specifically, the first positive electrode active material may be represented by Formula 1 below.

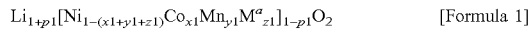  [Formula 1]

In Formula 1, $M^a$ is at least one or more elements selected from the group consisting of Ba, Ca, Zr, Ti, Mg, Ta, Nb, Al, Cr and Mo, and $0<p1\leq0.2$, $0<x1\leq0.5$, $0<y1\leq0.5$, $0\leq z1\leq0.1$, and $0<x1+y1+z1\leq0.7$.

In the lithium composite transition metal oxide of Formula 1, Li may be included at a content corresponding to 1+p1, wherein $0<p1\leq0.2$. In the above-described range, the improvement of the output and capacity characteristics of the battery may be shown at a significant level.

In the lithium composite transition metal oxide of Formula 1, Ni may be included at a content corresponding to $1-(x1+y1+z1)$, for example, $0.3\leq1-(x1+y1+z1)<1$.

In the lithium composite transition metal oxide of Formula 1, Co may be included at a content corresponding to x1, wherein $0<x1\leq0.5$. When the content of Co in the lithium composite transition metal oxide of Formula 1 is more than 0.5, there is a concern about increased costs.

In the lithium composite transition metal oxide of Formula 1, $M^n$ may enhance the stability of the active material, and thus the stability of the battery may be improved. In consideration of the life span improving effect, the $M^n$ may be included at a content corresponding to y1, wherein $0<y1\leq0.5$. When the y1 content in the lithium composite transition metal oxide of Formula 1 is more than 0.5, there are concerns about degradation of the output and capacity characteristics of the battery.

In the lithium composite transition metal oxide of Formula 1, $M^a$ may be a doping element included in the crystalline structure of the lithium composite transition metal oxide, and $M^a$ may be included at a content corresponding to z1, wherein $0\leq z1\leq0.1$.

The average particle size ($D_{50}$) of the first positive electrode active material may be 7 to 20 μm, more preferably, 8 to 17 μm, and even more preferably, 10 to 15 μm, and within the above-described range, the capacity characteristic of the battery may be further enhanced.

The second positive electrode active material is a lithium composite transition metal oxide which includes transition metals such as nickel (Ni), cobalt (Co) and manganese (Mn), like the first positive electrode active material.

The second positive electrode active material may be a lithium composite transition metal oxide which does not contain excess lithium, the thermal stability of the active material may be enhanced since the crystallite size is 180 nm or more due to over-sintering, and the destruction of the active material structure may be effectively prevented. Accordingly, cycle characteristics may be ensured without degradation of the enhancement of the capacity characteristic of the battery.

The second positive electrode active material may have the ratio $(Li/Me)_2$ of the mole number of lithium (Li) with respect to the total mole number of the transition metal of 0.9 to 1, and specifically, 0.95 to 1. When the ratio $(Li/Me)_2$ is less than 0.9, there is a concern about a reduction in battery capacity, and when the ratio is more than 1, gassing caused by electrolyte side reactions of the first positive electrode active material and/or the second positive electrode active material may be intensified, the thermal stability of the active material may be degraded, and oxygen is deintercalated from the active material structure in charging/discharging, and the side reaction with an electrolyte may be intensified. For these reasons, a battery cell may be deteriorated.

Specifically, the second positive electrode active material may be represented by Formula 2 below.

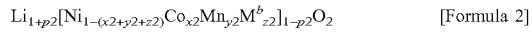  [Formula 2]

In Formula 2, $M^b$ is at least one or more elements selected from the group consisting of Ba, Ca, Zr, Ti, Mg, Ta, Nb, Al, Cr and Mo, and $-0.05\leq p2\leq0$, $0<x2\leq0.5$, $0<y2\leq0.5$, $0\leq z2\leq0.1$, and $0<x2+y2+z2\leq0.7$.

In the lithium composite transition metal oxide of Formula 2, Li may be included at a content corresponding to 1+p2, wherein $-0.05\leq p2\leq0$. Within the above-described range, the cycle characteristics and thermal stability of the battery may be ensured.

Each of x2, y2, z2 and $M^b$ may refer to the same component and/or content as each of x1, y1, z1 and $M^a$ described with reference to Formula 1.

The crystallite size of the second positive electrode active material may be 180 nm or more, specifically, 180 to 450 nm, more specifically, 200 to 430 nm, and even more specifically, 230 to 400 nm. When the crystallite size of the second positive electrode active material is controlled within the above-described range, the deterioration of the cycle characteristics and the destruction of the active material structure due to excess lithium contained in the first positive electrode active material may be significantly prevented. When the crystallite size of the second positive electrode active material is less than 180 nm, the thermal stability of the first positive electrode active material and/or the second positive electrode active material may be degraded, and thus the cycle characteristics of the battery may be deteriorated. The gassing amount may be increased due to intensification of the electrolyte side reaction of the active material, and cracking of the positive electrode active material may occur due to decreased durability.

In the present invention, the "particle" refers to a micro-sized particle, and when these particles are enlarged, they can be classified as "grains" in the crystal form of tens of nano units. When the particles are more enlarged, a region defined by the lattice structure of atoms in a certain direction may be confirmed, and is called "crystallite." The size of the particle detected by XRD is defined by a crystallite size. According to a method of measuring a crystallite size, the crystallite size may be estimated using the peak broadening of XRD data, and may be quantitatively calculated by the Scherrer equation.

The second positive electrode active material having the above range of crystallite size may be obtained by over-sintering at a temperature which is approximately 50 to 100° C. higher than the general sintering temperature of a positive electrode active material, such as approximately 800 to 1,000° C.

The average particle size ($D_{50}$) of the second positive electrode active material may be 8 μm or less, preferably 1 to 7 μm, and more preferably, 2 to 6 μm. When the second positive electrode active material is contained in the above-described range, the rolling property of the active material is enhanced, and as the second positive electrode active material is effectively blended with the first positive electrode active material, the thermal stability of the positive electrode material for a lithium secondary battery may be enhanced.

The second positive electrode active material may be a secondary particle formed by agglomerating primary particles. Here, the second positive electrode active material, which is a relatively small particle, may be over-sintered, such that the average particle size ($D_{50}$) of the primary particle may be 0.3 µm or more. When the average particle size ($D_{50}$) of the primary particle of the second positive electrode active material is controlled within the above-described range, a high-temperature life span characteristic and the increase in gassing amount during high-temperature storage may be effectively prevented, cracking of the positive electrode active material caused by rolling may be prevented. More specifically, the average particle size ($D_{50}$) of the primary particle of the second positive electrode active material may be 0.3 to 8 µm, and even more specifically, the average particle size ($D_{50}$) of the primary particle of the second positive electrode active material may be 0.5 to 4 µm. Due to the decrease in specific surface area of the second positive electrode active material, which is a relatively small particle, the effect of reducing the side reaction with the electrolyte may be exhibited, and therefore, the effects of enhancing thermal stability and reducing gassing may be exhibited.

The first positive electrode active material and the second positive electrode active material may be mixed at a weight ratio of 60:40 to 85:15, and specifically, 65:35 to 75:25. When the active materials are included in the above described ranges, the thermal stability of the active material may be enhanced, the destruction of the structure of the positive electrode active material and the deterioration of the cycle characteristics may be prevented, and the output and capacity characteristics of the battery may be further enhanced.

Positive Electrode for Lithium Secondary Battery

The present invention also provides a positive electrode for a lithium secondary battery, which includes the positive electrode material for a lithium secondary battery.

Specifically, the positive electrode for a lithium secondary battery includes a positive electrode current collector, and a positive electrode active material layer which is formed on the positive electrode current collector and includes the positive electrode material for a lithium secondary battery.

In the positive electrode for a lithium secondary battery, the positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 µm, and fine irregularities may be formed on the surface of the positive electrode current collector, thereby increasing the adhesive strength of a positive electrode active material or positive electrode material. For example, the positive electrode current collector may be used in various forms such as a film, a sheet, a foil, a net, a porous body, foam, a non-woven fabric, etc.

The positive electrode active material layer may include a conducting agent and a binder as well as the above-described positive electrode material for a lithium secondary battery.

The conducting agent is used to impart conductivity to an electrode, and is not particularly limited as long as it has electron conductivity without causing a chemical change in a battery. A specific example of the conducting agent may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conducting agent may be generally contained at 1 to 30 wt % with respect to the total weight of the positive electrode material layer.

The binder serves to enhance the cohesion between the positive electrode active material particles and the adhesive strength between the positive electrode material and the positive electrode current collector. A specific example of the binder may be polyvinylidene fluoride (PVDF), a vinylidene fluoride-hexafluoropropylene-co-polymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 1 to 30 wt % with respect to the total weight of the positive electrode material layer.

The positive electrode for a lithium secondary battery may be manufactured according to a conventional method of manufacturing a positive electrode, except that the above-described positive electrode material for a lithium secondary battery is used. Specifically, the positive electrode may be manufactured by applying a composition for forming a positive electrode active material layer, which includes the above-described positive electrode active material, and selectively, a binder and a conducting agent, on the positive electrode current collector, and drying and rolling the resulting product. Here, the types and contents of the positive electrode material, the binder and the conducting agent are the same as described above.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conducting agent and the binder and then imparting a viscosity for exhibiting excellent thickness uniformity when the slurry is applied to prepare a positive electrode.

As another method, the positive electrode for a lithium secondary battery may be manufactured by casting the composition for forming the positive electrode active material layer on a separate support, and laminating a film obtained by delamination from the support on the positive electrode current collector.

Lithium Secondary Battery

The present invention also provides an electrochemical device including the positive electrode for a lithium secondary battery. The electrochemical device may be, specifically, a battery or a capacitor, and more specifically, a lithium secondary battery.

The lithium secondary battery specifically includes a positive electrode, a negative electrode disposed opposite to the positive electrode, and a separator interposed between the positive electrode and the negative electrode and an electrolyte, wherein the positive electrode is the same as described in the above-described positive electrode for a lithium secondary battery. In addition, the lithium secondary battery may include a battery case accommodating an electrode assembly of the positive electrode, the negative electrode and the separator, and selectively, a sealing member for sealing the battery case.

In the lithium secondary battery, the negative electrode includes a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer selectively includes a binder and a conducting agent as well as the negative electrode active material. For example, the negative electrode active material layer may be prepared by applying a composition for forming a negative electrode, which includes the negative electrode active material, and selectively a binder and a conducting agent, on a negative electrode current collector and drying the composition, or casting the composition for forming the negative electrode on a separate support and then laminating a film obtained by delamination from the support on the negative electrode current collector.

As the negative electrode active material, a compound enabling the reversible intercalation and deintercalation of lithium may be used. A specific example of the negative electrode active material may be a carbon-based material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbon-based material such as a Si—C composite or a Sn—C composite, and any one or a mixture of two or more thereof may be used. In addition, as the negative electrode active material, a metal lithium thin film may be used. In addition, as a carbon material, both of low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high temperature calcined carbon such as petroleum or coal tar pitch-derived cokes.

In addition, the binder and the conducting agent may be the same as described above for the positive electrode.

Meanwhile, in the lithium secondary battery, a separator is not particularly limited as long as it is generally used in a lithium secondary battery to separate a negative electrode from a positive electrode and provide a movement path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a melt-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the mobility of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate having high ion conductivity and high permittivity to increase the charge/discharge performance of a battery (for example, ethylene carbonate or propylene carbonate) and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance a lifespan characteristic of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode material according to the present invention stably exhibits excellent discharge capacity, an excellent output characteristic and excellent capacity retention, it is useful in portable devices such as a mobile phone, a notebook computer and a digital camera and an electric automobile field such as a hybrid electric vehicle (HEV).

Therefore, the present invention provides a battery module including the lithium secondary battery as a unit cell, and a battery pack including the same.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, embodiments of the present invention will be described in detail with reference to the accompanying drawings so that those of ordinary skill in the art can easily carry out the present invention. However, the present invention may be implemented in a variety of different forms, and is not limited to the embodiments described herein.

EXAMPLE 1

As a first positive electrode active material, a lithium composite transition metal oxide in which an average particle size ($D_{50}$) was 11 um, a molar ratio of Ni:Co:Mn was 33:25:42 and $(Li/Me)_1$ was 1.1 was prepared.

As a second positive electrode active material, a lithium composite transition metal oxide in which an average particle size ($D_{50}$) was 5 μm, the molar ratio of Ni:Co:Mn was 60:20:20, and $(Li/Me)_2$ was 1 was prepared, and the second positive electrode active material was over-sintered at 880° C., and thus prepared in the form of a secondary particle which had a crystallite size of 200 nm and an average particle size ($D_{50}$) of a primary particle of 1.8 μm. A positive electrode material for a lithium secondary battery was prepared by mixing the first positive electrode active material and the second positive electrode active material at a weight ratio of 70:30.

EXAMPLE 2

A positive electrode material for a lithium secondary battery was prepared by the same method as described in Example 1, except that, as a second positive electrode active material, a lithium composite transition metal oxide in which an average particle size ($D_{50}$) was 5 μm, a molar ratio of Ni:Co:Mn was 60:20:20, and $(Li/Me)_2$ was 1 was used, and the second positive electrode active material was over-sintered at 950° C. and thus prepared in the form of a secondary particle which has a crystallite size of 250 nm, and a primary particle has an average particle size ($D_{50}$) of 0.6 μm.

EXAMPLE 3

A positive electrode material for a lithium secondary battery was prepared by the same method as described in Example 1, except that, as a first positive electrode active material, a lithium composite transition metal oxide in which an average particle size ($D_{50}$) was 11 μm, the molar ratio of Ni:Co:Mn was 28:22:50, and $(Li/Me)_1$ was 1.3 was used.

COMPARATIVE EXAMPLE 1

A positive electrode material for a lithium secondary battery was prepared by the same method as described in Example 1, except that, as a second positive electrode active material, a lithium composite transition metal oxide in which an average particle size ($D_{50}$) was 5 μm, the molar ratio of Ni:Co:Mn was 60:20:20, and $(Li/Me)_2$ was 1.1 was prepared, and the second positive electrode active material was over-sintered at 880° C., and thus prepared in the form of a secondary particle which had a crystallite size of 200 nm and an average particle size ($D_{50}$) of a primary particle of 0.6 μm.

COMPARATIVE EXAMPLE 2

A positive electrode material for a lithium secondary battery was prepared by the same method as described in Example 1, except that, as a first positive electrode active material, a lithium composite transition metal oxide in which an average particle size ($D_{50}$) was 11 μm, a molar ratio of Ni:Co:Mn was 33:25:42 and $(Li/Me)_1$ was 1 was used.

COMPARATIVE EXAMPLE 3

A positive electrode material for a lithium secondary battery was prepared by the same method as described in Example 1, except that, as a second positive electrode active material, a lithium composite transition metal oxide in which an average particle size ($D_{50}$) was 5 μm, a molar ratio of Ni:Co:Mn was 60:20:20, and $(Li/Me)_2$ was 1 was used, and the second positive electrode active material was over-sintered at 800° C., and thus prepared in the form of a secondary particle which had a crystallite size of 120 nm and an average particle size ($D_{50}$) of a primary particle of 0.6 μm.

COMPARATIVE EXAMPLE 4

A positive electrode material for a lithium secondary battery was prepared by the same method as described in Example 1, except that, as a second positive electrode active material, a lithium composite transition metal oxide in which an average particle size ($D_{50}$) was 5 μm, a molar ratio of Ni:Co:Mn was 60:20:20, and $(Li/Me)_2$ was 1 was used, and the second positive electrode active material was over-sintered at 820° C. and thus prepared in the form of a secondary particle having a crystallite size of 150 nm and an average particle size ($D_{50}$) of a primary particle of 0.6 μm.

EXPERIMENTAL EXAMPLES

Experimental Example 1: Evaluation of Rolling Density

Rolling densities of the positive electrode materials for a lithium secondary battery prepared in Examples 1 to 3 and Comparative Examples 1 to 4 were evaluated, and the results are shown in Table 1 and FIG. 1.

5 g of the positive electrode active material prepared in each of Examples 1 to 3 and Comparative Examples 1 to 4 was dispensed to fully fill a cylindrical holder with the active material, and then the density of a powder was measured by applying a pressure from 400 kgf up to 2000 kgf while being increased by 400 kgf.

TABLE 1

| | Example 1 | Example 2 | Example 3 | Comparative Example 1 | Comparative Example 2 | Comparative Example 3 | Comparative Example 4 |
|---|---|---|---|---|---|---|---|
| Rolling density (g/cc) (@400 kgf) | 2.55 | 2.59 | 2.68 | 2.17 | 2.36 | 2.23 | 2.30 |
| Rolling density (g/cc) (@2000 kgf) | 2.80 | 2.83 | 2.92 | 2.34 | 2.59 | 2.44 | 2.51 |

Referring to FIG. 1 and Table 1, it can be seen that, in Examples 1 to 3 using a first positive electrode active material having $(Li/Me)_1$ of more than 1 to 1.5 or less and a second positive electrode active material having $(Li/Me)_2$ of 0.9 to 1 and over-sintered to have a crystallite size of 180 nm or more, the rolling density was significantly enhanced, compared with the Comparative Examples.

Experimental Example 2: Evaluation of Thermal Stability

A positive electrode composite (density: 5000 mPa·s) was prepared by mixing each of the positive electrode materials for a lithium secondary battery prepared by Examples 1 to 3 and Comparative Examples 1 to 4, a carbon black conducting agent and a PVdF binder in a N-methylpyrrolidone solvent at a weight ratio of 96.5:1.5:2, applied to one surface of an aluminum current collector, dried at 130° C., and then rolled, resulting in the manufacture of a positive electrode.

As a negative electrode, a lithium metal was used.

A lithium secondary battery was manufactured by manufacturing an electrode assembly by interposing a separator of porous polyethylene between the positive electrode and the negative electrode, which were prepared as described above, placing the electrode assembly in a case, and injecting an electrolyte solution into the case. Here, the electrolyte solution may be prepared by dissolving 1.0M lithium hexafluorophosphate ($LiPF_6$) in an organic solvent consisting of ethylene carbonate/dimethyl carbonate/ethyl methyl carbonate (the mixed volume ratio of EC/DMC/EMC=3/4/3).

Each lithium secondary battery half cell manufactured using each of the positive electrode active materials prepared by Examples 1 to 3 and Comparative Examples 1 to 4 was charged at a current of 0.2 C and dissembled in an SOC 100% charged state, the positive electrode and a novel electrolyte solution were put into a cell for differential scanning calorimetry (DSC) measurement, and the thermal stability was measured through DSC while the temperature increased by 10° C. per minute from room temperature up to 400° C. As a result, the temperatures at which the main peak, which is the maximum heat flow, is shown are shown in Table 2, and the heat flow according to each temperature is shown in FIG. 2.

TABLE 2

| | DSC main peak (° C.) |
|---|---|
| Example 1 | 231 |
| Example 2 | 234 |
| Example 3 | 237 |
| Comparative Example 1 | 221 |
| Comparative Example 2 | 225 |
| Comparative Example 3 | 223 |
| Comparative Example 4 | 225 |

Figure 2:
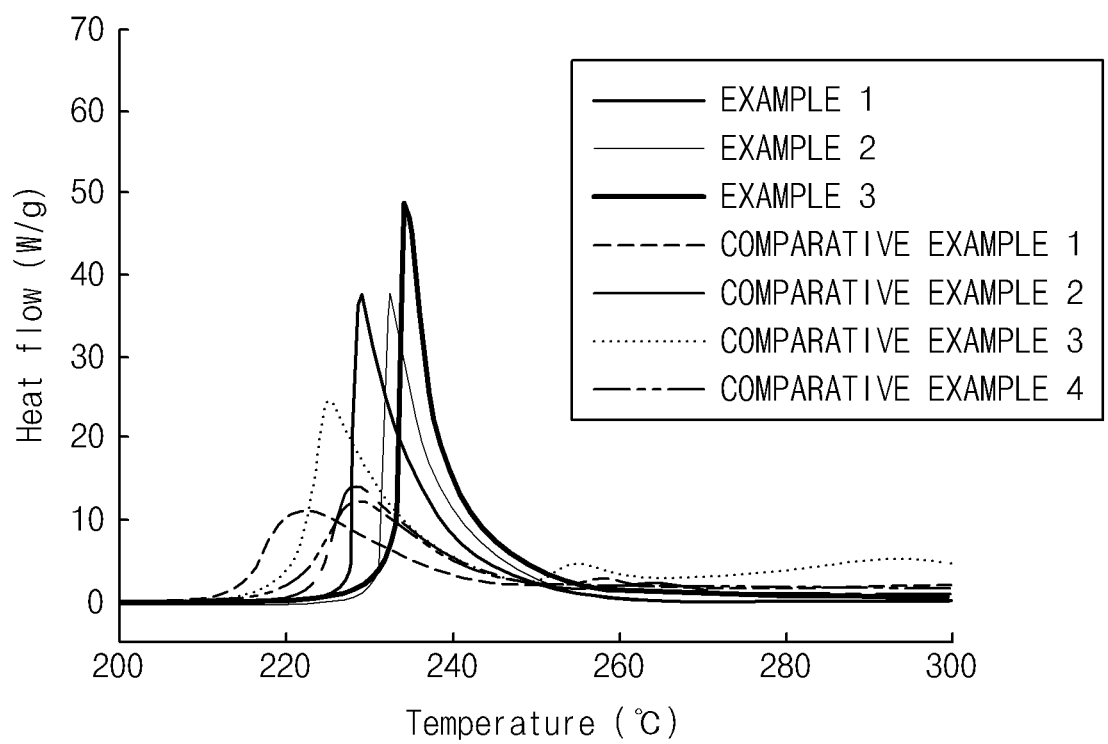
FIG. 2 is a graph of thermal stability of lithium secondary batteries according to Examples and Comparative Examples, which are evaluated by differential scanning calorimetry.

Referring to FIG. 2 and Table 2, it can be seen that Examples 1 to 3 using a first positive electrode active material having $(Li/Me)_1$ of more than 1 to 1.5 or less and a second positive electrode active material having $(Li/Me)_2$ of 0.9 to 1 and over-sintered to have a crystallite size of 180 nm or more are significantly enhanced in thermal stability, compared with the Comparative Examples.

Experimental Example 3: Evaluation of High-Temperature Life Span Characteristic Each lithium secondary battery half cell manufactured using each of the positive electrode materials prepared by Examples 1 to 3 and Comparative Examples 1 to 4 by the method described in Experimental Example 2, was charged at 45° C. in a CCCV mode until the current and voltage reached 0.33 C and 4.25V (End current: 1/20 C), discharged at a constant current of 0.33 C until 2.5V, and then subjected to measurement of capacity retention when a 100 charge/discharge cycle experiment was performed to evaluate a high-temperature life span characteristic. The results are shown in Table 3.

TABLE 3

| | Initial discharge capacity (mAh/g) | Capacity retention (%) (@100 cycles) |
|---|---|---|
| Example 1 | 176 | 82 |
| Example 2 | 179 | 85 |
| Example 3 | 181 | 89 |
| Comparative Example 1 | 166 | 65 |
| Comparative Example 2 | 170 | 75 |
| Comparative Example 3 | 168 | 68 |
| Comparative Example 4 | 169 | 70 |

Referring to Table 3, it can be seen that Examples 1 to 3 using a first positive electrode active material having (Li/Me)$_1$ of more than 1 to 1.5 or less and a second positive electrode active material having (Li/Me)$_2$ of 0.9 to 1 and over-sintered to have a crystallite size of 180 nm or more are significantly enhanced in high-temperature life span characteristic, compared with the Comparative Examples.

However, in Comparative Example 1 in which both (Li/Me)$_1$ and (Li/Me)$_2$ are more than 1, it can be confirmed that structural stability is greatly reduced, and therefore, the capacity retention was significantly reduced.

In addition, in Comparative Example 2 in which both (Li/Me)$_1$ and (Li/Me)$_2$ are 1 or less, compared with Comparative Example 1, the capacity retention was enhanced, but compared with Examples, performance was not good.

In addition, in Comparative Examples 3 and 4 using a second positive electrode active material having a small crystallite size due to insufficient or no over-sintering, it can be confirmed that the structural stability and thermal stability of the active material are significantly reduced, and the high-temperature life span characteristic is not great.

Experimental Example 4: Evaluation of High-Temperature Storage Characteristic

Each lithium secondary battery half cell manufactured using each of the positive electrode materials prepared by Examples 1 and 2 and Comparative Examples 1 to 3 by the method as described in Experimental Example 2 was subjected to 100 cycles of charging/discharging at 45° C. under conditions of 1.0 C/1.0 C, and then an gassing amount of the discharged cell was measured using a gas chromatograph-mass spectrometer (GC-MS). The result is shown in FIG. 3 and Table 4.

TABLE 4

|  | Example 1 | Example 2 | Example 3 | Comparative Example 1 | Comparative Example 2 | Comparative Example 3 | Comparative Example 4 |
| --- | --- | --- | --- | --- | --- | --- | --- |
| $H_2$ (μl) | 2 | 2 | 2 | 2.5 | 4.7 | 4 | 3.2 |
| CO (μl) | 15 | 14 | 10.5 | 30.4 | 20 | 27.1 | 22.1 |
| $CO_2$ (μl) | 36 | 30 | 14 | 70.2 | 42 | 60.5 | 55.5 |
| $CH_4$ (μl) | 3.7 | 3.7 | 3.7 | 10.2 | 6.2 | 8.5 | 7 |
| $C_2H_2$ (μl) | 0.1 | 0.1 | 0.1 | 0.1 | 0.1 | 0.1 | 0.1 |
| $C_2H_4$ (μl) | 5.4 | 3.5 | 5.4 | 18.2 | 8.2 | 16.6 | 15.2 |
| $C_2H_6$ (μl) | 1 | 1 | 1 | 2.2 | 1.5 | 1.9 | 1.2 |
| $C_3H_6$ (μl) | 0.1 | 0.1 | 0.1 | 0.1 | 0.1 | 0.1 | 0.1 |
| $C_3H_8$ (μl) | 0.1 | 0.1 | 0.1 | 0.1 | 0.1 | 0.1 | 0.1 |
| Total gassing amount (μl) | 63.4 | 54.5 | 36.9 | 134 | 82.9 | 118.9 | 104.5 |

Figure 3:
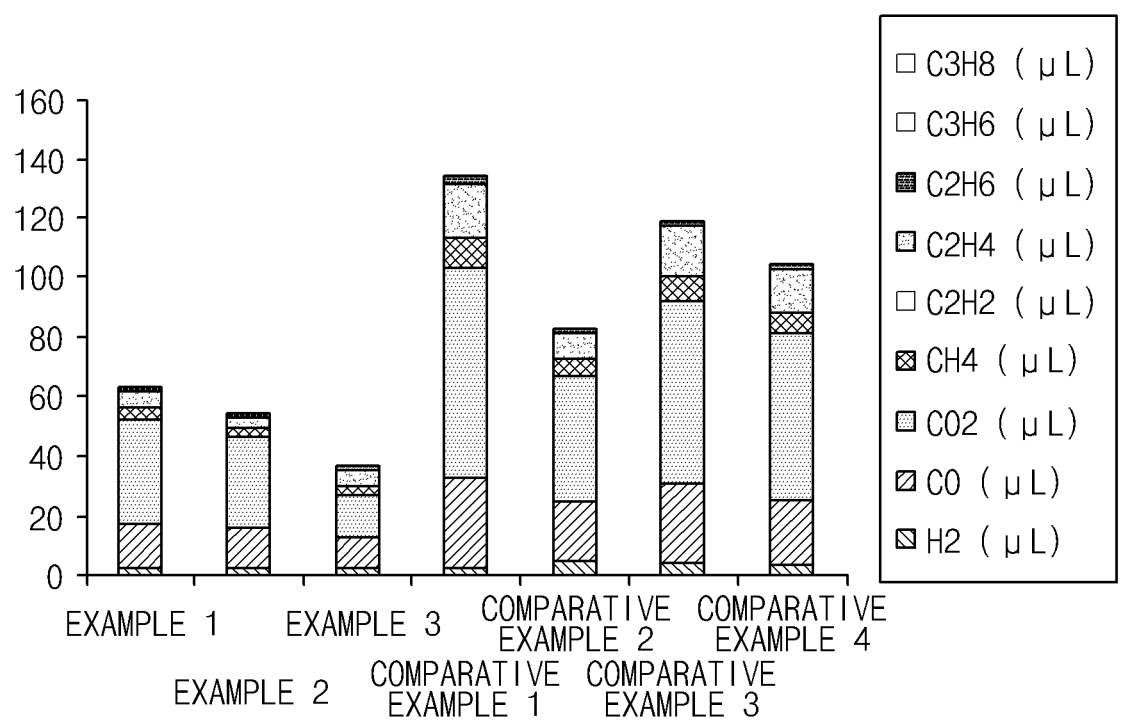
FIG. 3 is a graph of gassing amounts of lithium secondary batteries according to Examples and Comparative Examples, measured using a gas chromatograph-mass spectrometer (GC-MS).

Referring to FIG. 3 and Table 4, it can be seen that Examples 1 to 3 using a first positive electrode active material having (Li/Me)$_1$ of more than 1 to 1.5 or less and a second positive electrode active material having (Li/Me)$_2$ of 0.9 to 1 and over-sintered to have a crystallite size of 180 nm or more have a significantly low gassing amount and a significantly enhanced high-temperature storage characteristic, compared with Comparative Examples.

Experimental Example 5: Evaluation of Output and Cycle Characteristics

The lithium secondary batteries of Examples and Comparative Examples were subjected to 400 cycles of charge/discharge at room temperature (25° C.) in a driving voltage range from 2.8 to 4.15V under conditions of 1 C/2 C.

In addition, to evaluate the output characteristic, the batteries charged/discharged at room temperature (25° C.) were charged based on SOC 50% to measure a resistance, and a width of voltage sagging while current is applied based on SOC 50% at a low temperature (−30° C.) was measured.

As a result, resistances at room temperature (25° C.) and a low temperature (−10° C.), and capacity retention, which is a ratio of discharge capacity at the 400$^{th}$ cycle to the initial capacity after 400 cycles of charge/discharge performed at room temperature were measured, and the result is shown in Table 5 below.

TABLE 5

|  | Resistance (mohm) at room temperature (25° C.) | Voltage sagging (Δ V) at low temperature (−10° C.) | 400-cycle capacity retention (%) at room temperature (25° C.) |
|---|---|---|---|
| Example 1 | 19.2 | 0.38 | 66 |
| Example 2 | 17.2 | 0.36 | 70 |
| Example 3 | 14.2 | 0.32 | 75 |
| Comparative Example 1 | 29.2 | 0.62 | 35 |
| Comparative Example 2 | 23.5 | 0.48 | 52 |
| Comparative Example 3 | 25.2 | 0.55 | 45 |
| Comparative Example 4 | 25.6 | 0.53 | 48 |

Referring to Table 5, it can be seen that Examples 1 to 3 using a first positive electrode active material having (Li/Me)$_1$ of more than 1 to 1.5 or less and a second positive electrode active material having (Li/Me)$_2$ of 0.9 to 1 and over-sintered to have a crystallite size of 180 nm or more, compared with Comparative Examples, have a lower resistance, a lower voltage sagging at a low temperature, a higher cycle capacity retention, and thus overall higher battery characteristics.

The invention claimed is:

1. A positive electrode material for a lithium secondary battery, comprising:
a first positive electrode active material and a second positive electrode active material, wherein the first positive electrode active material and the second positive electrode active material are lithium composite transition metal oxides containing transition metals comprising nickel (Ni), cobalt (Co) and manganese (Mn),
an average particle size (D$_{50}$) of the first positive electrode active material is larger than an average particle size (D$_{50}$) of the second positive electrode active material,
a ratio (Li/Me)$_1$ of a mole number of lithium with respect to a total mole number of transition metals of the first positive electrode active material is more than 1 to 1.5 or less,
a ratio (Li/Me)$_2$ of a mole number of lithium (Li) with respect to a total mole number of transition metals of the second positive electrode active material is 0.9 to 1, and the second positive electrode active material has a crystallite size of 180 nm or more, wherein the second positive electrode active material is a secondary particle formed by agglomerating primary particles, and an average particle size (D$_{50}$) of the primary particle is 0.6 μm or more and wherein the first positive electrode active material is represented by Formula 1 below:

$$Li_{1+p1}[Ni_{1-(x1+y1+z1)}Co_{x1}Mn_{y1}M^a_{z1}]_{1-p1}O_2 \quad \text{[Formula 1]}$$

Where $M^a$ is at least one or more elements selected from the group consisting of Ba, Ca, Zr, Ti, Mg, Ta, Nb, Al, Cr and Mo, and
$0 < p1 \leq 0.2$, $0 < x1 \leq 0.5$, $0 < y1 \leq 0.5$, $0 \leq z1 \leq 0.1$, and $0 < x1+y1+z1 \leq 0.7$.

2. The positive electrode material according to claim 1, wherein the crystallite size of the second positive electrode active material is from 180 to 450 nm.

3. The positive electrode material according to claim 1, wherein the average particle size (D$_{50}$) of the second positive electrode active material is 8 μm or less.

4. The positive electrode material according to claim 1, wherein the average particle size (D$_{50}$) of the first positive electrode active material is 9 to 20 μm.

5. The positive electrode material according to claim 1, wherein the second positive electrode active material is represented by Formula 2 below:

$$Li_{1+p2}[Ni_{1-(x2+y2+z2)}Co_{x2}Mn_{y2}M^b_{z2}]_{1-p2}O_2 \quad \text{[Formula 2]}$$

where $M^b$ is at least one or more elements selected from the group consisting of Ba, Ca, Zr, Ti, Mg, Ta, Nb, Al, Cr and Mo, and
$-0.05 \leq p2 \leq 0$, $0 < x2 \leq 0.5$, $0 < y2 \leq 0.5$, $0 \leq z2 \leq 0.1$, and $0 < x2+y2+z2 \leq 0.7$.

6. The positive electrode material according to claim 1, wherein the first positive electrode active material and the second positive electrode active material are mixed in a weight ratio of 60:40 to 85:15.

7. A positive electrode for a lithium secondary battery, comprising the positive electrode material for a lithium secondary battery according to claim 1.

8. A lithium secondary battery comprising the positive electrode for a lithium secondary battery according to claim 7.

* * * * *